May 22, 1934.  R. H. CUNNINGHAM  1,960,180
COMPOSITE MATERIAL

Filed Feb. 11, 1932

INVENTOR
ROY H. CUNNINGHAM
BY HIS ATTORNEYS

Howson and Howson

Patented May 22, 1934

1,960,180

UNITED STATES PATENT OFFICE 1,960,180

COMPOSITE MATERIAL

Roy H. Cunningham, Fairfield, Conn., assignor to The Bryant Electric Company, Bridgeport, Conn., a corporation of Connecticut Application February 11, 1932, Serial No. 592,408

10 Claims. (Cl. 154—28)

This invention relates to composite materials, and methods of manufacturing the same, and more particularly to materials and methods of this character in which a layer of heat resisting material is asosciated with a layer of plastic molded material.

It is an object of the invention to protect surfacing materials which may be affected by heat or electric arcing, to permit the use of such surfacing materials in installations which are subject to these conditions.

Another object of the invention is to provide a composite material, the inner side of which is adapted to withstand fairly high temperatures or electric arcing, and the outer surface of which is adapted to present a pleasing finish.

Further objects are to improve the constructions and properties of materials of this character, to render them economical to produce, able to withstand rough usage, and otherwise well adapted for the purposes set forth.

Other objects and features of novelty will be apparent as the following description proceeds, reference being had to the accompanying drawing, in which Figure 1 is a section through a plate of composite material constructed according to the preferred embodiment of the present invention;

Figure 1:
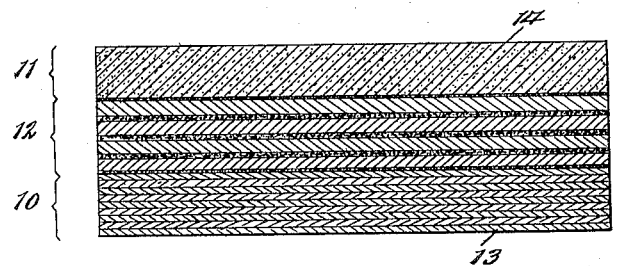

As shown in Figure 1, the composite material comprises a layer of heat resisting material 10, another layer of plastic molded material 11, and an intermediate layer 12. The layer 10 is preferably an inner layer, the surface 13 of which is exposed to heat or electric arcing, while the layer 11 is preferably an outer layer, the surface 14 of which is exposed to view, and is therefore desired to present a pleasing appearance. The intermediate layer 12 has the characteristics of both the inner layer 10 and the outer layer 11, so that there is a gradual change in the composition of the material, from the heat resisting surface 13 through the material to the finish surface 14.

Figures 3, 4:
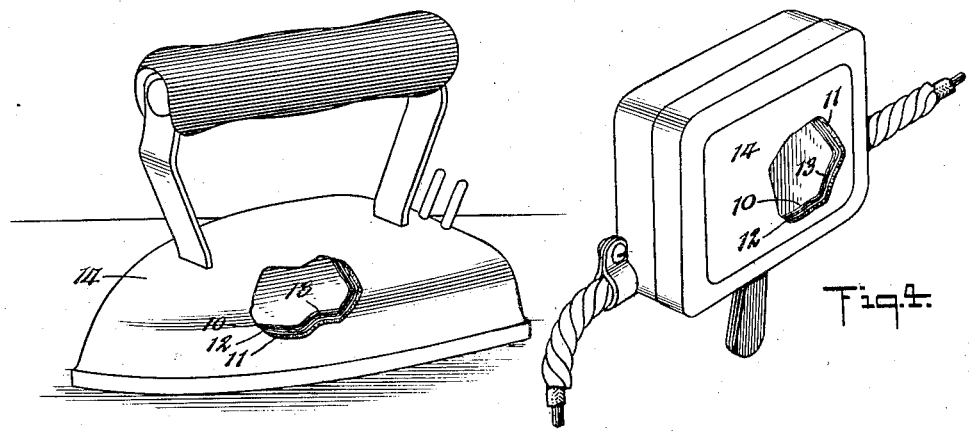
Figure 3 is a perspective view of an electric flat iron having a casing constructed according to Figure 1, and having a portion broken away to show the material thereof.
Figure 4 is a similar view of a casing constructed in the same manner, for an electric switch circuit breaker.

As shown in Figure 3, in which the composite material forms a layer or casing for an electric flatiron, the surface 14 is an outer finished surface, and the inner surface 13 is exposed to the temperature of the heating element of the flatiron. This inner surface may with equal advantage be exposed to electric arcing, as in the case of the electric switch circuit breaker as shown in Figure 4. A plate form of the composite material is desirable for various instrument panels. However, these examples are merely illustrative and are not exhaustive, as there are a large number of installations for which this composite material is adapted, and the scope of the invention therefore embraces such installations where one surface of a plate or casing is a finished surface, and the other surface is exposed to either heat or electric arcing.

The heat resisting material of which the layer 10 is composed is preferably fibrous and, when a molded casing is desired, sufficiently pliable to permit the molding into the desired shape. Asbestos is a very satisfactory example of such materials. The layer 10 may be conveniently built up of sheets of asbestos paper bonded together by fireproof cement, such as silicate of soda. The plastic molded material of the layer 11 is preferably resinous, phenol condensation products being desirable for their surfacing qualities and their adaptability for the molding operation. The intermediate layer 12 is preferably composed of laminations of one of the materials of layer 10 bonded together by layers of the material employed in the layer 11. This construction prevents a sharp line of demarcation along which the layers might tend to separate.

Figure 2:
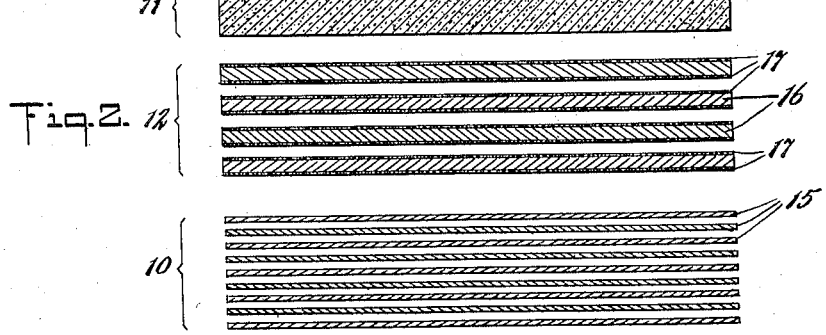
Figure 2 is an exploded view of the layers and laminations shown in Figure 1.

The method of manufacture of a plate or casing of the composite material shown in Figure 1, according to a preferred embodiment of the present invention, is illustrated diagrammatically in Figure 2. Comparatively thin sheets of asbestos paper 15 are coated, preferably on each side, with a heat resisting cement, such as silicate of soda. Depending upon the thickness desired for the layer 10, as many of such coated sheets as necessary are pressed together in a damp state and allowed to set.

More sheets of asbestos 16, sufficient to total the desired thickness of the layer 12, are coated preferably on each side with a phenol resin having a high melting point. This phenol resin is preferably in the form of a thin varnish having a specific gravity of about 0.9. These sheets are allowed to dry separately to form the coatings 17 thereon.

The asbestos sheets coated with silicate of soda are placed in a mold and the sheets coated with phenol resin are placed above the same, and covered with a sufficient quantity of phenol resin molding powder to form the layer 11. Heat and pressure is then applied to complete the molding operation.

As the heat and pressure is applied, the coatings 17 of the laminations 16 are fused together and form the layer 12, and the phenol resin molding powder fuses to form the layer 11. The upper coating 17 of the upper lamination 16 forms a bond with the layer 11, and the lower coating 17 of the lower lamination forms a bond with the layer 10. At the same time, the bond of the silicate of soda between the laminations 15 of the layer 10 is unaffected, if not improved, by the molding process. Hence the layers and laminations of the composite material are securely bonded together, and the plate or casing is adapted to withstand rough usage.

From the foregoing description it will be readily apparent that the composite material according to the present invention will overcome the difficulties heretofore experienced with ordinary molded phenol resin. The asbestos acts as a successful heat insulator so that great heat can be applied to that side of the material without affecting the molded phenol resin on the other side. Also, the asbestos will withstand electric arcing which molded phenol resin alone could not withstand. The composite material is therefore adapted for a wide variety of uses where an outer surface like plastic molded material is desired, and which is subjected on its inner side to electric arcing or high temperatures.

I claim:

1. A composite material comprising an inner layer of heat resisting material, an outer layer of hardened molded material, and an intermediate layer comprising laminations of heat resisting material bonded together by plastic molded material.

2. A composite material comprising an inner layer or heat resisting material, an outer layer of molded material, and an intermediate layer comprising sheets of asbestos bonded together by phenol resin.

3. A composite material comprising an inner layer of heat resisting material comprising sheets of asbestos bonded together by heat resisting cement, an intermediate layer comprising sheets of asbestos bonded together by phenol resin, and an outer layer of molded phenol resin.

4. A molded plate or casing having an inner heat resisting surface and an outer molded resinous surface, the material between said surfaces decreasing in heat resisting characteristics and increasing in resinous characteristics, from the inner surface toward the outer surface.

5. A method of manufacturing a composite material, comprising coating sheets of asbestos with heat resisting cement, inserting a layer of said coated sheets into a mold, applying an intermediate layer of asbestos sheets coated with phenol resin over said heat resisting layer, covering said intermediate layer with phenol resin molding powder, and subjecting said mold to heat and pressure.

6. A composite material comprising an inner layer formed of sheets of asbestos bonded together by heat resisting cement, an intermediate layer formed of sheets of asbestos coated on both sides and bonded together by phenol resin, and an outer layer of phenol resin molded over said intermediate layer, said layers being bonded together by the outer coatings of phenol resin on said intermediate layer.

7. A method of manufacturing a composite material, comprising forming an inner layer by bonding sheets of asbestos together by heat resisting cement, forming an intermediate layer by coating on both sides and bonding together sheets of asbestos by phenol resin, and molding an outer layer of phenol resin over said intermediate layer, whereby said layers are bonded together by the outer coatings of phenol resin on said intermediate layer.

8. A composite material having a heat resisting inner surface and an outer molded finish surface, there being a gradual change in the composition of the material as to heat resistance, from the heat resisting surface through the material to the outer molded finish surface.

9. A composite material comprising an inner layer of electric arc resisting material, an outer layer of plastic molded material and an intermediate layer effecting a gradual change in the composition of the material as to electric arc resistance between said inner and outer layers.

10. Method of manufacturing a composite material of electric arc resisting material and plastic molding material, which comprises forming an inner electric arc resisting surface and an outer molded surface, and decreasing the electric arc resisting material and increasing the plastic molded material from said inner surface toward said outer molded surface.

ROY H. CUNNINGHAM.